(12) United States Patent
Girbal

(10) Patent No.: US 8,463,846 B2
(45) Date of Patent: Jun. 11, 2013

(54) FILE BUNDLING FOR CACHE SERVERS OF CONTENT DELIVERY NETWORKS

(75) Inventor: Antoine Jean Girbal, Los Gatos, CA (US)

(73) Assignee: CDNetworks Co., Ltd., Seoul (KR)

( * ) Notice: Subject to any disclaimer, the term of this patent is extended or adjusted under 35 U.S.C. 154(b) by 513 days.

(21) Appl. No.: 12/775,348

(22) Filed: May 6, 2010

(65) Prior Publication Data

US 2011/0276623 A1    Nov. 10, 2011

(51) Int. Cl.
- *G06F 15/16* (2006.01)
- *G06F 13/00* (2006.01)
- *G06F 17/30* (2006.01)

(52) U.S. Cl.
USPC ........... 709/203; 709/213; 709/219; 707/706; 707/E17.01; 711/113; 711/118; 711/E12.023

(58) Field of Classification Search
USPC ............ 709/203, 213, 219; 707/705, E17.01; 711/113, 118, E12.023
See application file for complete search history.

(56) References Cited

U.S. PATENT DOCUMENTS

| | | | | |
|---|---|---|---|---|
| 6,963,981 B1 * | 11/2005 | Bailey et al. | ...................... | 726/22 |
| 7,249,219 B1 * | 7/2007 | Mowat et al. | .................. | 711/113 |
| 7,756,913 B1 * | 7/2010 | Day | .............................. | 707/821 |
| 7,818,321 B2 * | 10/2010 | Hegde et al. | ................... | 707/736 |
| 8,078,759 B2 * | 12/2011 | Seifert et al. | .................... | 709/246 |
| 8,219,562 B1 * | 7/2012 | Rothschild et al. | ........... | 707/741 |
| 8,224,786 B2 * | 7/2012 | Atluri et al. | .................... | 707/660 |
| 2005/0021563 A1 * | 1/2005 | Shaburov | ................... | 707/104.1 |
| 2005/0138176 A1 * | 6/2005 | Singh et al. | .................... | 709/226 |
| 2006/0010293 A1 * | 1/2006 | Schnapp et al. | .............. | 711/119 |
| 2006/0069719 A1 * | 3/2006 | McCanne et al. | ............. | 709/203 |
| 2007/0005779 A1 * | 1/2007 | Yao et al. | ....................... | 709/228 |
| 2007/0089110 A1 * | 4/2007 | Li | .................. | 717/178 |
| 2007/0124290 A1 * | 5/2007 | Swanson et al. | ................... | 707/3 |
| 2007/0156845 A1 * | 7/2007 | Devanneaux et al. | ......... | 709/217 |
| 2008/0046596 A1 * | 2/2008 | Afergan et al. | ............... | 709/247 |
| 2009/0094382 A1 * | 4/2009 | Tsimelzon et al. | ........... | 709/246 |
| 2010/0070643 A1 * | 3/2010 | Puranik et al. | ................ | 709/231 |
| 2010/0131671 A1 * | 5/2010 | Kohli et al. | .................... | 709/233 |
| 2010/0205239 A1 * | 8/2010 | Greiner et al. | ................ | 709/203 |
| 2010/0235569 A1 * | 9/2010 | Nishimoto et al. | ........... | 711/103 |
| 2011/0060742 A1 * | 3/2011 | Heller et al. | ................... | 707/741 |
| 2011/0066676 A1 * | 3/2011 | Kleyzit et al. | ................. | 709/203 |
| 2011/0179467 A1 * | 7/2011 | Wei et al. | ........................... | 726/3 |
| 2011/0246555 A1 * | 10/2011 | Hedges | ........................ | 709/203 |
| 2012/0030264 A1 * | 2/2012 | Horn | ........................ | 707/829 |
| 2012/0072596 A1 * | 3/2012 | Kruse et al. | ................... | 709/226 |
| 2012/0124097 A1 * | 5/2012 | Wei et al. | ...................... | 707/792 |
| 2012/0136704 A1 * | 5/2012 | Carlson et al. | ............. | 705/14.17 |

* cited by examiner

*Primary Examiner* — Alina N Boutah

(74) *Attorney, Agent, or Firm* — Fenwick & West LLP

(57) ABSTRACT

Data access time in content delivery networks is improved by storing files in cache servers as file bundles. A cache server determines that multiple files are requested by the same client based on information available in the request including the IP address of the client, a URL of a webpage referring to the file, and/or a cookie stored at a client. The cache server stores multiple files requested by the same client on the hard drive as a file bundle with meta data associating the files with one another, such that they can be accessed together. A future request from the client for a file in a file bundle results in multiple files from the file bundle being loaded in the memory. If the client requests another file from the file bundle, the file is accessed directly from the memory instead of the hard drive, resulting in improved performance.

21 Claims, 11 Drawing Sheets

FILE BUNDLING FOR CACHE SERVERS OF CONTENT DELIVERY NETWORKS

BACKGROUND

1. Field of the Invention

The present invention relates to cache servers of a content delivery network (CDN) and, in particular, to optimization of hard drive performance in cache servers of content delivery networks (CDNs).

2. Description of the Related Art

Content delivery networks (CDNs) provide fast delivery of data from sources of data to clients via servers placed at strategic locations in a network. A server that is the original source of the data is called the origin server. Copies of the data are cached on various servers of the CDN. When a user requests data or files, the user request is served by a server of the CDN that is near the client rather than the origin server. As a result, the data access time is reduced and bottlenecks created by centralized sources of data are avoided.

Web applications often require access to a large number of small files to display a single web page to a user. For example, in a social networking website, the web page of a user may display different types of information including user profile, images of friends of the user in the social network, status information of the friends, newsfeed from various sources, and the like. This information may be scattered across a hard drive of a server or across multiple hard drives of different servers within the CDN. Aggregating the data for responding to a request may require access to multiple servers, or multiple hard drives within each server, as well as access to different positions within each hard drive (also referred to as a disk or a disk drive).

Accessing data in a hard drive requires mechanical movements in the hard drive. For example, a seek operation is required to move the hard drive to a position that allows the disk head to read data. As a result read/write operations of a hard drive are significantly slow compared to computer operations that do not require mechanical movements like processing or accessing data in random access memory (RAM). If an application accesses data that is physically scattered at various positions on a hard drive, multiple seek operations are required to access the data. This can cause significant overhead in accessing the data and degrade the performance of the application.

Conventional ways of improving the disk throughput of such applications include use of a hard rive with better seek performance, use of solid-state drives (SSD) instead of hard drives, or use of large RAM. Hard drives with better seek performance can be expensive and the cost of replacing existing hard drives with faster ones may be prohibitive. SSDs have fast read/write operations since they do not require mechanical movement of parts for accessing data. However, a solution based on SSDs can be prohibitive since SSDs have a higher cost per megabyte storage compared to traditional hard drives. Similarly use of machines with large RAM or addition of RAM to existing machines involves additional costs that may be prohibitive. Besides, increasing RAM improves the performance of an application only if the same data is accessed multiple times. The performance improves because subsequent accesses of data loaded in RAM do not require disk access. A small RAM causes the data to be flushed from the RAM to make room for newer data. As a result, if the data that has been flushed is requested again by the client, a disk access is required. A large RAM prevents subsequent disk accesses for the same data by storing large amount of data in RAM. However, if an application does not access the same data multiple times, increasing the size of the RAM does not improve performance since the data stored in the RAM is never accessed in future.

SUMMARY

According to various embodiments, data access time in content delivery networks is improved by storing files in cache servers as bundles with metadata associating the files in the bundles, such that fewer read operations of a storage device are required. The cache server receives a request and retrieves a first file from a first content source. The cache server receives another request and retrieves a second file from the first content source or a second content source. If the cache server determines that the two requests were received from the same client, the cache server stores the two files on a storage device with metadata associated at least the first file and the second file. Both the files can be accessed together due to the metadata, for example, by a single read operation of the storage device.

If a request for a file is received from a client when the file is not available in the memory of the cache server, the cache server checks if the requested file belongs to a bundle stored on the storage device. A bundle includes files that were previously requested by the same client and stored together with metadata associating the files with one another, all or at least some of which can be accessed together, for example, via a single read operation of the storage device. The cache server loads to its memory the requested file along with other files from the bundle that were previously requested by the same client. If a request for another file of the bundle is received from the same client, the file is accessed from the memory of the cache server and does not require a read operation of the storage device. As a result multiple files requested by the same client can be retrieved with fewer read operations of the storage device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1:
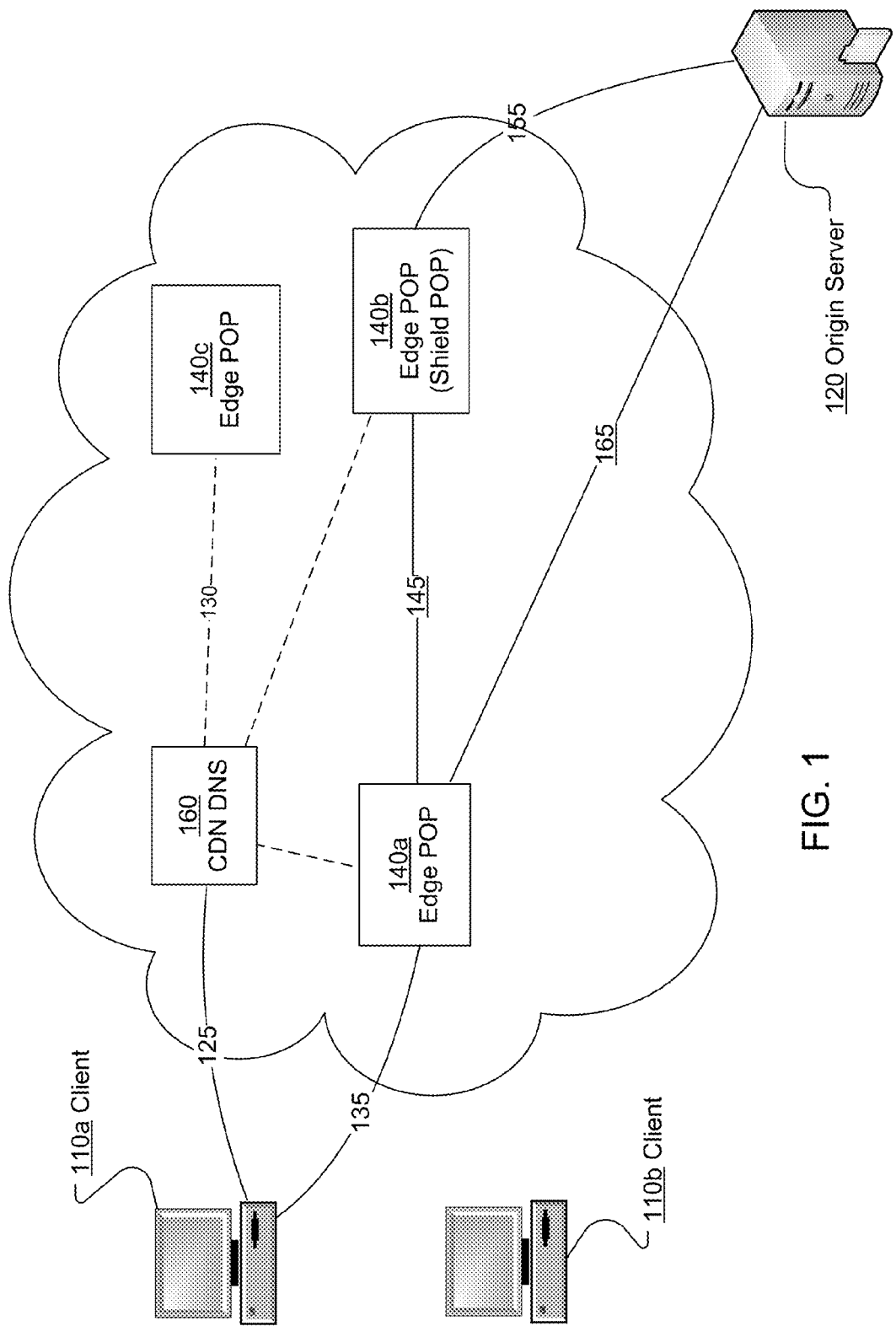
FIG. 1 illustrates the overall architecture of a CDN, in accordance with an embodiment of the present invention.

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. Like reference numerals are used in the figures to identify like elements.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

In general, embodiments of the present invention improve access time of files or data retrieved via a CDN. A CDN is comprised of a distributed network of servers that cache copies of data or files. A server that caches files in a CDN is called a cache server. The data or files may be copied from one or more sources of data called origin servers. A client's requests are served by a cache server that provides faster access compared to other cache servers in the CDN or the origin server.

Files requested by a client can be scattered across different cache servers in the CDN. Files within each cache server can be scattered across multiple hard drives and within each hard drive across various positions of the hard drive. As a result, accessing data from each hard drive can require multiple seek operations to retrieve files stored in different positions of the hard drive. The cache server analyzes the requests to determine whether multiple requests are received from the same client. The source of the request is determined based on information available in the request, for example, internet protocol (IP) address of the client, a uniform resource locator (URL) of a web page that refers to the file requested, cookies stored at the client or other information. The cache server accumulates files requested by the same client and groups them together as a file bundle. A file bundle is stored on the hard drive with metadata associating the files in the bundle with one another, such that files within the bundle are stored in adjacent positions within the hard drive and can be accessed together, for example, by a single seek operation of the hard drive.

If a request for a file is received by the cache server from a client when the requested file is not available in the memory of the cache server, the cache server loads the file from the hard drive to the memory. The cache server checks if the file requested is stored as part of a file bundle associated with the client. If it finds a file bundle associated with the client that stores the file, the cache server loads the requested file as well as other files in the bundle that were previously requested by the client using the metadata. Since the client has requested a particular file, the chances of the client also requesting other related files stored in the file bundle are high. If the client sends a request for another file within the file bundle, the second file can be accessed from the memory of the cache server without having to access it from the hard drive. Herein, the term "bundle" is used to denote a logical collection of files stored together with metadata associating the files in the bundle to one another, at least some of which may be read into memory from the hard drives together when another one of the files in the bundle is read into the memory. All or some remaining files of the bundle may be read into memory together with the requested file. Therefore, the requests from the client can be served by fewer seek operations of the hard drive to access the file bundle, and in some embodiments by a single seek operation of the hard drive to access all the files in the file bundle. For example, assume a web page from a social network website displaying a photo album summary comprising five thumbnail images. If the web page is served via a CDN that does not utilize the file bundling scheme described herein, the images may be retrieved from five different cache servers of the CDN in the worst case. On the other hand, if the web page is served via a CDN utilizing the file bundling scheme described herein, all five images may be retrieved from a single cache server, assuming the five files are stored in a single file bundle.

FIG. 1 illustrates the overall architecture of a content delivery network (CDN), in accordance with an embodiment of the present invention. A CDN comprises various data centers referred to herein as edge point of presence (edge POP) 140*a*, 140*b*, 140*c* that are placed at various points in the network and store copies of data for access by clients 110. While the example of FIG. 1 shows only three edge POPs 140*a*, 140*b*, 140*c*, there may be a larger number of edge POPs in real applications of the CDN. The data is made available by a source of data referred to herein as the origin server 120 that may be provided by an enterprise that utilizes the services of the CDN. A CDN can serve a larger number of origin servers 120 and a large number of clients 110.

The edge POPs 140*a*, 140*b*, 140*c* of the CDN periodically send a ping message to a local domain name system (DNS) used by the client 110*a* to get an estimate of latency of communication with the client 110*a*. The local DNS of the client 110*a* may execute on a computer system separate from the client 110*a* or may execute on the client 110*a* itself. A CDN DNS 160 periodically sends a message 130 to the various edge POPs 140*a*, 140*b*, 140*c* of the CDN to gather the above latency estimates measured by the various edge POPs 140. The latency estimates provide a measure of the delay experienced by a client 110*a* in receiving a response to its request from the edge POP.

When a client 110*a* needs to use the CDN for serving requests, the client 110*a* sends a request 125 to the DNS 160 for the network address of a server in the edge POPs 140*a*, 140*b*, 140*c* for serving requests from the client 110*a*. Based on the current latency measurements, the DNS 160 may determine that edge POP 140a is the optimal edge POP to serve client 110a, and provide the client 110a with the network address of a server in the edge POP 140a that can provide fast response to requests from client 110a. In some embodiments, the selection of the edge POP 140a to process the requests for a client 110a can be based on other criteria, for example, the load on the servers in the edge POPs, network congestion, or monetary cost of using the edge POP 140a. The client 110a sends subsequent requests 135 for data directly to the edge POP 140a.

If the client 110a requests a file from the edge POP 140a that is not available at the edge POP 140a, the edge POP 140a identifies a different source that contains the requested file and retrieves it. Such different source may be another edge POP 140b, 140c or the origin server 120 of the customer of the CDN. The edge POP 140a stores the retrieved file locally to serve future requests for the file. In one embodiment, the edge POP 140a sends a request 165 to the origin server 120 to retrieve the requested file. If the number of clients 110 requesting the file is large, multiple edge POPs 140 may send requests 165 to the origin server 120. This may create significant load for the origin server 120 that can exceed the capacity of the origin server 120. An alternative embodiment assigns an edge POP referred to herein as a shield POP 140b to the origin server 120. The shield POP 140b is a dedicated POP designated to communicate directly with the origin server 120, whereas other edge POPs 140a, 140b request the file from the shield POP 140b and do not communicate directly with the origin server 120. For example, the edge POP 140a sends a request 145 to the shield POP 140b for a file that is not available at edge POP 140a. If the requested file is available at the shield POP 140b, the shield POP 140b responds to the request 145 from edge POP 140a. If the requested file is not available at the shield POP 140b, the shield POP 140b retrieves 155 the file from the origin server 120 and then responds to the request 145 with the requested file. The shield POP 140b stores a copy of the file in case other edge POPs 140 request the same file. As a result, requests 145 for a file from multiple edge POPs 140 are served by the shield POP 140b and only a single request is received by the origin server 120 for that file. Accordingly, the origin server 120 is shielded by the shield POP 140b that prevents a large number of requests from being sent directly to the origin server 120.

In one embodiment, there can be multiple shield POPs 140b associated with an origin server 120 if the numbers of requests from the client is very large. The multiple shield POPs 140b can each access the origin server 120 for data that is not available at the shield POPs. As a result, for a specific data or file, the origin server 120 can receive as many requests as the number of shield POPs assigned to it. An edge POP 140b receiving requests from the client can identify an appropriate shield POP to obtain data or may be assigned a shield POP by the CDN DNS 160. Alternatively, the shield POPs 140b can be arranged to form a hierarchy such that shield POPs 140b that are lower in the hierarchy request data from shield POPs 140b that are higher in the hierarchy. In another embodiment, an edge POP 140a attempts to obtain data that is not available at the edge POP 140a from other edge POPs 140b, 140c that are not shield POPs.

Figure 2:
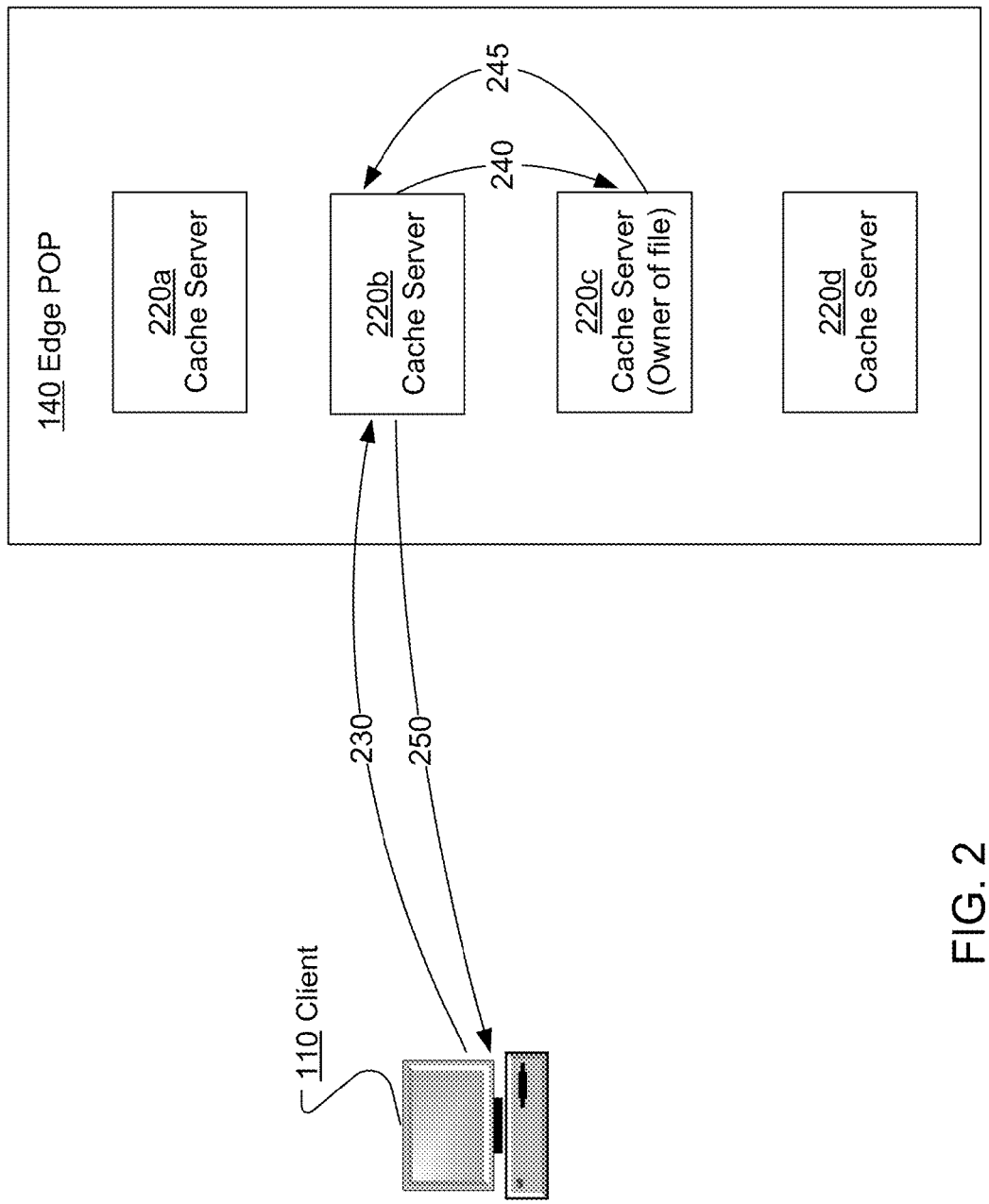
FIG. 2 illustrates the architecture of an edge point of presence (POP), in accordance with an embodiment of the present invention.

FIG. 2 illustrates the architecture of an edge POP in a CDN. Each edge POP 140 comprises multiple cache servers 220a, 220b, 220c, 220d. FIG. 2 shows an edge POP 140 with four cache servers 220a, 220b, 220c, and 220d. The files served by the edge POP 140 are distributed across the cache servers 220a, 220b, 220c, 220d so that the load associated with serving the files is distributed across the cache servers. Each file is assigned to a cache server 220a, 220b, 220c, and 220d referred to as the "owner" of the file. If a cache server 220b receives a request for a file which is owned by a different cache server 220c, the cache server 220b retrieves the file from the owner cache server 220c. If the owner does not have a copy of the file, the owner obtains the file from a source of the file outside its edge POP 140, for example, the origin server. Assigning an owner to each file ensures that only the owner cache server retrieves the file from a source outside the edge POP 140. The overhead of retrieving the file from outside the edge POP can be significantly higher than retrieving the file from a cache server within the edge POP 140. As a result, the number of requests for files sent to sources outside the edge POP are reduced by assigning an owner cache server to each file. Alternatively, if each cache server is allowed to send a request for the file to a source outside the edge POP 140, the number of requests sent across POPs can be significantly higher, resulting in high network traffic across edge POPs in the CDN. In an embodiment, an owner of a file stores a copy of the file on the hard drive 310.

In one embodiment, the owner cache server of a file is determined by using a mapping function that maps information identifying the file to a cache server 220a, 220b, 220c, or 220d. In one embodiment, the information identifying the file comprises the URL of the file. In one embodiment, the mapping function can be a hash function based on the URL of the file. For example, if the hash function returns a value x in the range 0.0-1.0, URLs that return a value in the range $0.0 <= x < 0.25$ have cache server 220a as the owner, URLs that return a value $0.25 <= x < 0.5$ have cache server 220b as the owner, URLs that return a value $0.5 <= x < 0.75$ have cache server 220c as the owner and the remaining URLs that return a value $0.75 <= x <= 1.0$ have cache server 220d as the owner.

As shown in FIG. 2, a client 110 sends to edge POP 140 a request 230 that may be received by any one of the cache servers 220a, 220b, 220c, 220d. In one embodiment, the cache server 220b may be selected to serve the request 230 from a particular client by a round-robin strategy. In an embodiment, the round robin strategy is implemented by the CDN DNS 160 that provides the network address of a cache server 220b from the edge POP 140 to a client 110. In an embodiment, related requests from a client may be considered part of a session and the cache server 220b selected to serve requests from client 110 serves all requests associated with the session from the client 110.

The cache server 220b that receives the request 230 may not be the owner of the file requested by client 110. In such case, the cache server 220b may determine that the cache server 220c is the owner of the file requested based on the URL of the file, for example, using a hash function. The cache server 220b sends a request 240 to the owner 220c of the file and receives 245 the file. The cache server 220b responds 250 to the request 230 by sending the requested file to the client 110.

Even though a cache server 220c is an owner of a file, the cache server 220c may not have the file available in cache server 220c when it receives a request 245 for the file. In this case, the cache server 220c retrieves the file from a source of the file, for example, the origin server 120 or a shield POP 140b. The file retrieved by the owner 220c is stored in cache server 220c for future requests for the file, for example, requests 245 from other cache servers or requests 230 that may be directly received from the client 110.

At a later stage, client 110 may be reassigned to another cache server, for example 220d. The cache server 220d may not have the file requested by the client. The cache server 220d retrieves the files from the owner of the file, which in this case is assumed to be the cache server 220b. In general, the owner of a file can receive a request for a file from every other cache server 220 that is not the owner of the file.

Figure 3:
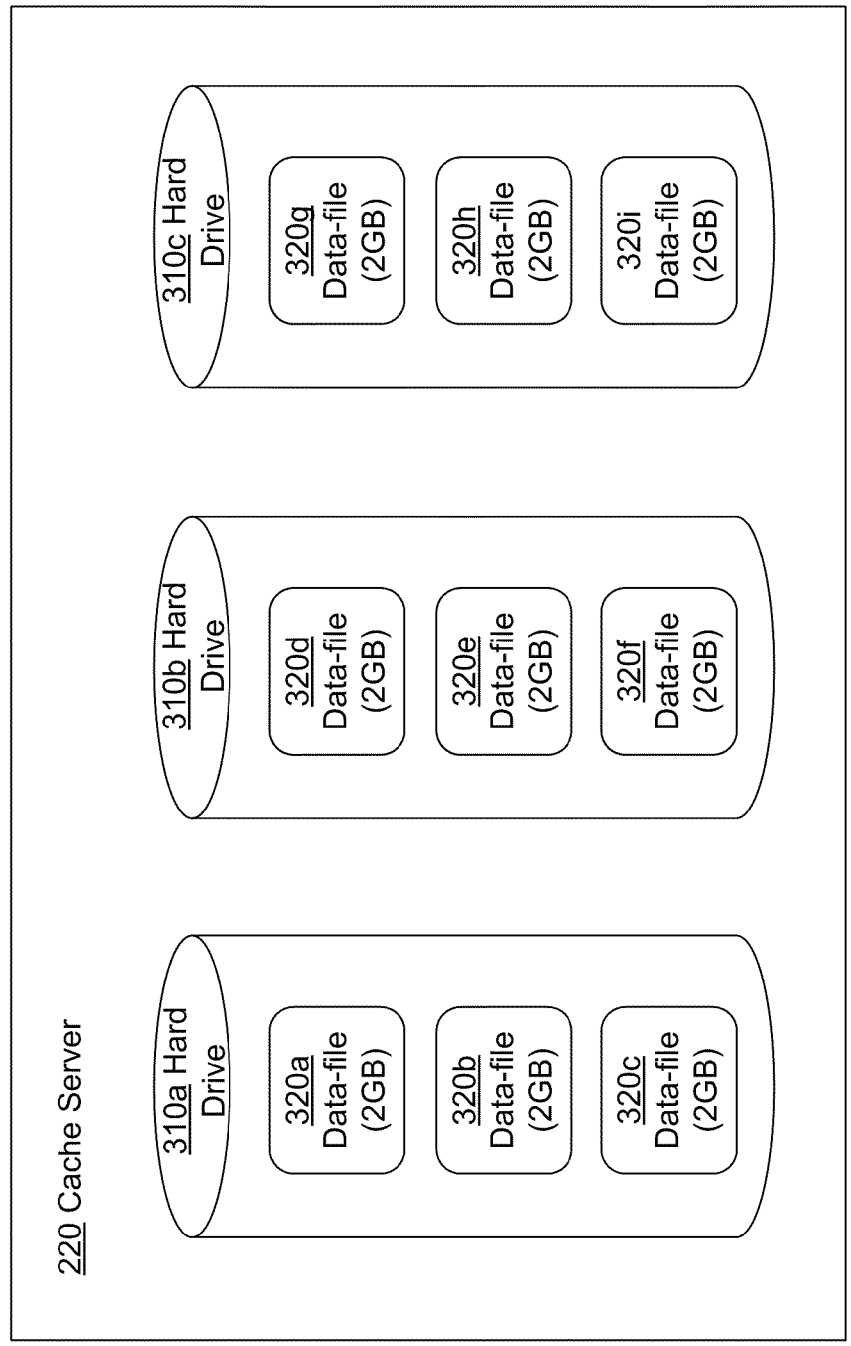
FIG. 3 illustrates the architecture of disk storage in a cache server, in accordance with an embodiment of the present invention.

FIG. 3 illustrates the architecture of the disk storage in a cache server 220, in accordance with an embodiment. The cache server 220 may have multiple hard drives 310a, 310b, 310c. Each hard drive 310a, 310b, 310c stores multiple data-files 320a, 320b . . . , 320i. A data-file 320 is a large file capable of storing information contained in several smaller user files. In an embodiment, each data-file 320 has a fixed capacity of several gigabytes (GB), for example, the data-files 320 shown in FIG. 3 have capacity of 2 GB each. There is an overhead of allocating space on a hard drive before a user file can be stored on the hard drive. If the space on the hard drive is allocated each time a user file is stored, the allocation overhead slows down the storing of the file. The use of large fixed sized data-files allows the space on the hard drive to be allocated in advance thereby making the individual operations of storing user files on the hard-drive efficient. In an embodiment, a disk index is maintained that stores the URLs of the files and their corresponding positions (or offsets) within the data-files 320a, 320b, . . . , 320i. Typically, several file bundles may be stored in a single data-file 320a, 320b, . . . , 320i. Furthermore, a file bundle is preferably stored within a single data-file. If the cache server 220 estimates that a data-file 320a does not have sufficient empty space to store an entire file bundle, a different data-file 320b with sufficient empty space is identified to store the file bundle.

Figure 4:
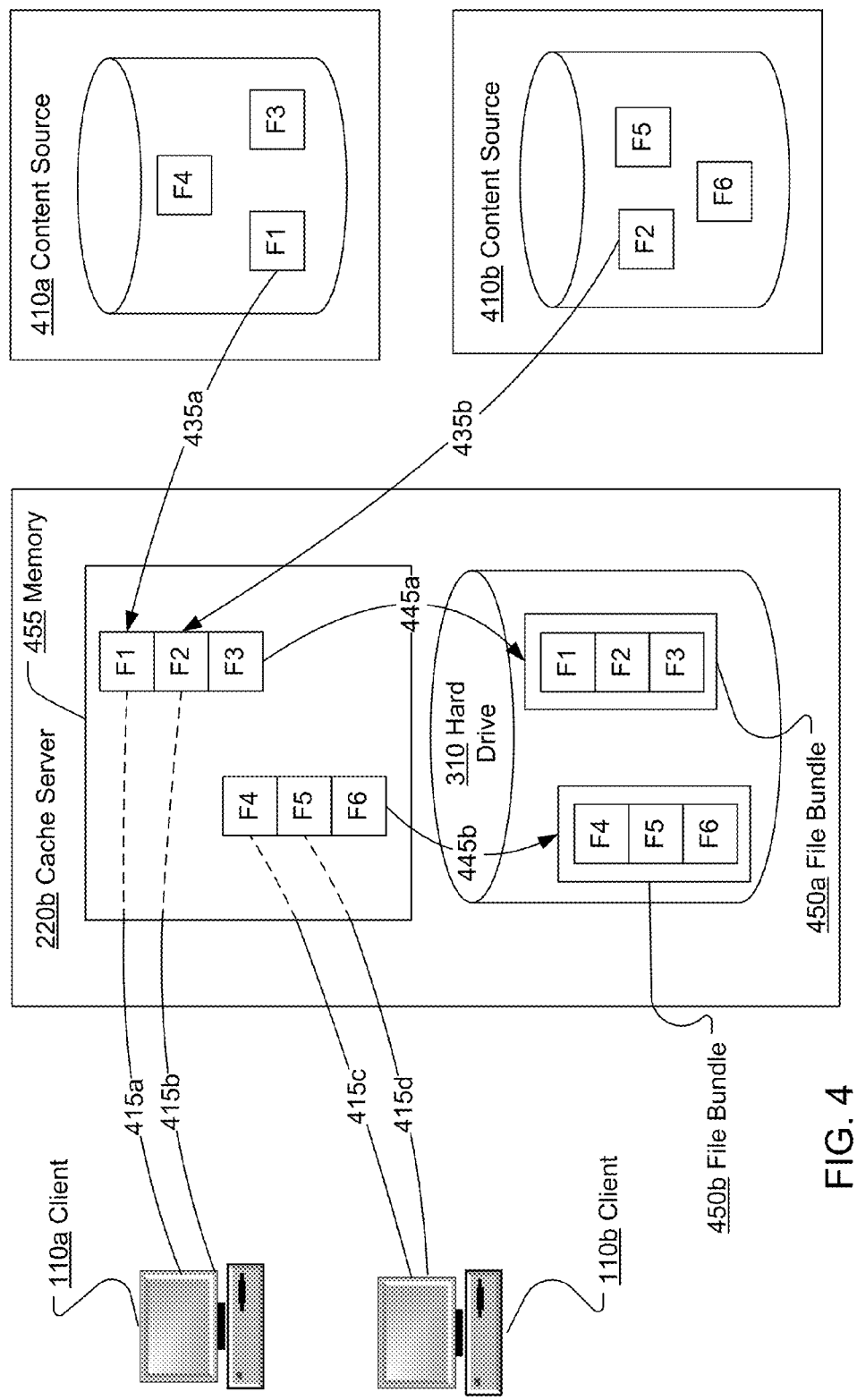
FIG. 4 illustrates a cache server retrieving files from various content sources in the CDN and storing them as file bundles, in accordance with an embodiment of the present invention.

FIG. 4 illustrates the interactions between a cache server, a client, and various sources of data according to an embodiment. The example of FIG. 4 assumes that CDN DNS 160 selected cache server 220b of edge POP 140a to serve the clients' requests. A cache server 220b that receives the incoming request from a client identifies files that are requested by the same client and stores them adjacent to each other on the hard drive as a file bundle. In some embodiments, the cache server writes only a subset of the files requested by the same client to the hard drive as a file bundle. For example, files determined to be very large (e.g., greater than 32 KB size) may not be added to the file bundle. In an embodiment, if the file is determined to be requested as part of a search result, the file may not be added to a file bundle since the affinity between files retrieved as part of a search result is not high as further described herein. A file can be determined to be requested as part of a search result if the URL of the web page that refers to the file is a URL of a search website. The cache server 220b comprises a memory 455 and at least a hard drive 310. Access of data from the memory 455 is significantly faster than access of data from the hard drive since the memory 455 involves no mechanical movement of parts. Furthermore, the time to access data from the memory 455 is independent of the position of the data in the memory 455, whereas the time to access data from the hard drive 310 depends on the position of the data within the hard drive. The position of the data within the hard drive 310 significantly affects the amount of the mechanical movement required by the hard drive to access the data, which in turn affects the time required to access the data on the hard drive. Larger amounts of mechanical movement of the hard drive 310 result in longer access time compared to smaller amounts of mechanical movement.

Data must be stored in the hard drive 310 for future availability of the data from the cache server. The memory 455 is volatile, and data stored in the memory 455 is lost if the power of the cache server 220 is turned off. Besides, the amount of storage space available in the memory 455 is significantly smaller than the amount of storage space available in the hard drive 310. Therefore, data stored in the memory 455 may get flushed in order to make room for newer data. Once the data in memory 455 is replaced by other data, the data is lost from the memory. Therefore, data stored in the memory 455 is also stored on the hard drive 310 at some point for future availability of the data.

As shown in FIG. 4, the cache server 220b receives a request 415a for file F1 from the client 110a. In an embodiment, the request 415a can be for any data or content that can be stored in a file. If the requested file F1 is not available at the cache server 220b, the cache server retrieves 435a the file from a content source 410a. Examples of content sources 410a, 410b from where the cache server 220b can retrieve the requested file include another cache server 220a, 220c, 220d within the same edge POP 140a, for example the owner of the file, the origin server 120, and other edge POPs 140 including the shield POP associated with the origin server 120. The cache server 220b can send a request for the file to a content source 410a, 410b which in turn can obtain the file from another content source. For example, a cache server 220b can send a request for a file to another cache server, for example the owner of the file, which can send a request for the file to a shield POP, which in turn can obtain the file from an origin server 120.

The files requested by the same client 110a may not be available at the same content source 410a, 410b. For example, the file F1 and F3 requested by client 110a are retrieved 435a from the content source 410a, whereas the file F2 is retrieved 435b from the content source 410b. However, once the cache server 220 has retrieved 435a, 435b the files and stored 445a them locally on the hard drive 310 of the cache server, subsequent requests for the same files can be served by the cache server 220 without accessing any external content source 410a, 410b.

The cache server 220b analyzes the incoming requests from clients to determine the source of the request so as to correlate requests received from the same client 110a, 110b. For example, the cache server 220b can determine that the requests 415a and 415b are received from the same client 110a whereas the requests 415c and 415d are received from another client 110b. The cache server 220b stores the files requested by the same client on the hard drive in positions close to each other to allow multiple files requested by the same client to be accessed with a single seek operation of the hard drive 310. For example, multiple files requested by the same client can be stored in adjacent positions on the hard drive 310.

To determine whether two requests are from the same source of requests, the cache server 220b analyzes the requests to identify information useful for determining the source of the request. For example, the request may contain the network address (also called the internet protocol (IP) address) of the client 110a, 110b sending the request. Two requests that contain the same client IP address can be considered to be sent by the same client. In some embodiments, the cache server 220b establishes a connection for a client 110a, 110b in order to process requests coming from the client 110a, 110b. A connection comprises data structures and information used for maintaining a sequence of interactions with a client 110a, 110b. The data structures of the connection allow information provided in one request to be used in a subsequent request. For example, a user providing authentication information in a request of the connection can get authenticated for subsequent requests associated with the connections. In these embodiments, two requests received via the same connection are considered to be sent by the same client. In some embodiments a connection pool is maintained that keeps a set of connections that are reused by different clients. A connection used by a client may be reassigned to a different client if the first client stops using the connection. In these embodiments, it may be possible for two requests received via a connection to be associated with two different clients. However, in general requests received from the same connection are likely to be sent by the same client. In some embodiments, a single client may be assigned to multiple connections, for example, 6 concurrent connections. Such client may concurrently request data on all connections assigned to it. The cache server analyzes requests across all connections to determine if the files are requested by the same client and should be stored together in a file bundle.

In some embodiments a cookie stored at the client device is received as part of the request. A cookie comprises a name value pair stored at the client. Two requests having the same value for a cookie are assumed to be sent by the same client $110a$, $110b$. In some embodiments, the requests may contain embedded parameters that can be used to identify a source of the request. For example, a user that logs into a website may provide a user-name. The user-name may be embedded as a parameter in subsequent requests received from the client. The presence of the same user-name parameter in two requests can be considered an indication that the two requests are sent by the same client.

In some embodiments, multiple files may be associated with a webpage of a website. Multiple requests may be received by a cache server $220b$ that are related to the same associated web page. In these embodiments, the URL of the web page that refers to the multiple files being requested may be available as part of the request for the files. Accordingly, a URL of a webpage associated with the client requests may be identified order to determine if the requests originated from a common source of requests. Embodiments use different types of information available in a request to identify the source of the request, for example, the source IP address of the connection, information embedded in a cookie value, information embedded in a hypertext transfer protocol (HTTP) header, client information from other headers available in the request, for example, "x-forwarded-for" header for requests that go through a proxy server.

Files requested by the same client are considered as having affinity towards each other. The cache server 220 groups files with affinity towards each other into file bundles. A file bundle 450a, 450b is stored 445a, 445b by the cache server 220b on the hard drive 310 such that files within the bundle are stored in adjacent positions on the hard drive. This allows subsequent reads of a file within the bundle to read related files within the bundle together, for example with a single seek operation or a small number of seek operations. This improves the performance of reads of multiple files with affinity towards each other since the seek overhead is incurred only once or for a small number of times for multiple files.

Multiple files with affinity towards each other can be prefetched into the memory 455 from the hard drive 310 before they are explicitly requested by the client. For example, assume that the files F1, F2, and F3 are not currently available in the memory 455. When a read operation of file F1 is requested, files F2 and F3 may be read along with file F1 even though the client has not yet requested files F2 and F3 since they are all stored as a file bundle 450b. Since the files F1, F2, F3 have affinity towards each other, the client is likely to request files F2 and F3 along with the file F1. If the client sends subsequent requests for any one of the files F2, F3 in the bundle 450b, the subsequent request does not incur the overhead of reading the files F2, F3 from the hard drive 310 since the files F2, F3 are already in memory 455. This elimination of the overhead of seek operations results in improved data access time for requests received from the same client.

The cache server 220b may have an in-memory representation of the file bundle comprising a set of files grouped together based on affinity. In one embodiment, the cache server 220b stores the files in the in-memory representation of the file bundle on the hard drive 310 if the number of files in the set reaches a threshold value. Storing a very large number of files in a file bundle may not be beneficial since the overhead of reading the file bundle increases with the bundle size. The overall improvement in performance with the use of a file bundle may not increase with increase in the file bundle size beyond a threshold. In one embodiment, the threshold value of file bundle size is 5 files. If each file is on an average 10 kilobytes (KB) in size, the overall bundle size reaches a value of 50 KB with 5 files. In an embodiment, the bundle size can be measured in terms of the total of sizes of all the files added to the bundle.

In an embodiment, the cache server 220b determines when to write an in-memory representation of a file bundle to the hard drive based on the age of the in-memory representation of the bundle. If the file bundle is not stored on the hard drive 310 for a very long time interval, the information stored in the in-memory representation may be lost if there is a failure of the cache server, for example, a power failure. As a result, subsequent requests may require the corresponding files to be retrieved again from the content sources 410, 410b, causing additional overhead. This overhead can be avoided by writing the file bundle to the hard drive at an appropriate timing. In one embodiment, the cache server 220b writes 445a the file bundle 450a to the hard drive 310 even if the number of files in the bundle is small if the age of the bundle reaches a threshold value. For example, the threshold bundle size can be five and the threshold age for writing a bundle can be 30 seconds. Accordingly, the bundle can be written to the hard drive 310 if the bundle size does not reach five files within 30 seconds. However, the bundle can be written to the hard drive 310 right away if the bundle size becomes five in less than 30 seconds.

In some embodiments, a file affinity measure for a file bundle is used to determine how long a file bundle is stored on disk and when it is overwritten with another file bundle. File bundles stored on the hard drive 310 may be overwritten by newer file bundles if the affinity between the files of the bundle is determined to be low. Affinity between files of a bundle is considered high if a request for a file from the bundle is typically followed by requests for other files of the bundle within a short time interval. Requests for files of a bundle may be analyzed over time to measure the affinity of files of the bundle. If two consecutive requests for files of the bundle are received after a very large time interval, the file bundle may be unloaded from the memory of the cache server before the second request is received. Therefore the file bundle has to be loaded or retrieved again for the second request resulting in a decrease in overall performance.

An example of a file bundle with low affinity is a file bundle comprising web pages requested as part of a search result. Since search results vary with changes in search criteria, chances of receiving two search requests with the exact same search criteria are low. Therefore, subsequent searches are likely to differ in their search criteria and therefore in the search results. As a result, different files of such file bundle are unlikely to be requested together. On the other hand, a file bundle comprising files requested as part of a photo album summary has high affinity between the files. The thumbnail images in a photo album summary page are likely to change less frequently compared to the frequency of viewing the photo album. Each time a web page displaying the photo album summary is loaded, requests for all the thumbnails of the photo album are likely to be received. If all the thumbnails of the photo album are stored in a file bundle, all thumbnails can be read with a single read operation of the hard drive 310.

FIG. 4 also illustrates a second client 110b that can send requests to the cache server 220b. As shown in FIG. 4, the client 110b sends a request 415c for file F4 and a request 415d for file F5. The cache server 220b may retrieve file F4 from content source 410a and file F5 from content source 410b. The cache server 220b uses information available in the requests 415c and 415d to determine that the requests are received from a client 110b that is different from the client 110a that sent the requests 415a and 415b. For example, the cache server 220b may use the IP address of the client sending the request or the value of a cookie stored on the client that is sent with the request to determine that requests 415a and 415b are sent by the same client 110a and the requests 415c and 415d are sent by a different client 110b. The cache server 220b stores 445b the files F4, F5, and F6 requested by the client 110b on the hard drive 310 as a file bundle 450b which is different from the file bundle 450a used for files F1, F2, and F3 requested by client 110a.

Figure 5:
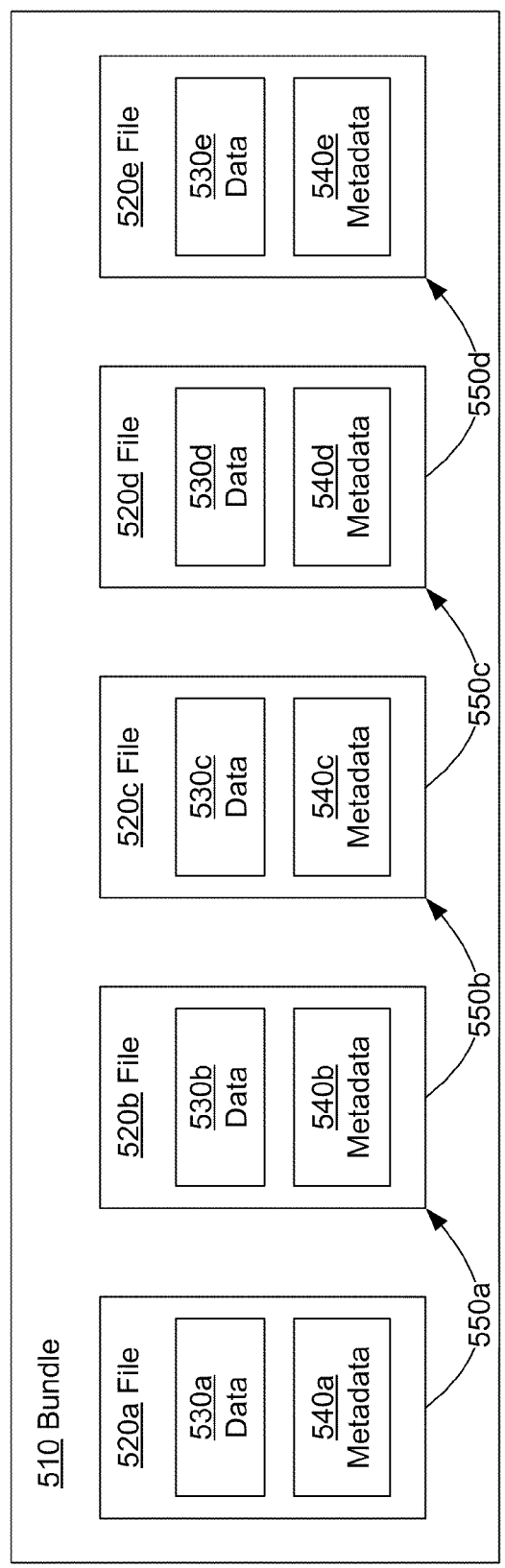
FIG. 5 illustrates the data structure of a file bundle associating multiple files requested by a client, in accordance with an embodiment of the present invention.

FIG. 5 illustrates the data structure of a file bundle 510 in accordance with an embodiment. Each file 520a, 520b, 520c, 520d, 520e stored within a bundle 510 comprises the data 530a, 530b, 530c, 530d, 530e of the file and metadata 540a, 540b, 540c, 540d, 540e associated with the file. The metadata of each file comprises information associating each file with other files in the bundle, for example, describing the position of other files within the bundle. FIG. 5 shows an embodiment in which the metadata 540a, 540b, 540c, 540d stores a pointer 550a, 550b, 550c, 550d to the next file in the file bundle 510 stored in the hard drive. The pointers 550a, 550b, 550c, 550d comprise locations of the file being pointed to on the hard drive.

If a read request is received for a file, a seek operation is performed by the hard drive to reach the corresponding file bundle 510, and multiple (some or all) associated files in the bundle are read along with the requested files. These additional files can be read without additional seek operations. The related files includes the files of the bundle that can be reached by following the metadata pointers 550a, 550b, 550c, 550d staring from the requested file. For example, if the requested file is file 520c, the additional files that are read include the files 520d and 520e that can be reached by following the metadata pointers 550c and 550d. In this case, the files 520a and 520b are not read since they cannot be reached by following the metadata pointers 550 starting from file 520c. In other embodiments, additional metadata may be stored related to file bundles to enable loading of all the files of the file bundles when a file 520c is loaded, rather than just the files that can be reached using the pointers 550. In one embodiment, each file in the bundle stores a pointer to the next file in the bundle and another pointer to the beginning location of the bundle. In this embodiment, the cache server performs a first read operation to fetch the metadata from the file including the beginning location of the bundle and then performs a second read operation to read the files of the bundle.

In an embodiment, the operating system of the cache server reads data stored in consecutive pages on the hard drive where a page comprises a set of consecutive bytes stored on the hard drive as determined by the operating system (OS). For example, each page of the OS can have 8 kilobytes of data consecutively stored on the hard drive. The page boundaries may not coincide with the file bundle boundaries. As a result more data may be read by the OS than that required exclusively for the file bundle. However, the metadata of the files of the file bundle can be used to identify appropriate files from the pages read. In some embodiments, the cache server issues a read request to the OS and the OS reads multiple pages of the hard drive 310 into its file system cache. The OS can have a system parameter that determines how many pages are read with each disk read operation. For example, a "read-ahead" setting in LINUX OS can have a default value of 128 KB. In this case, the OS reads 128 KB even if a request for only 16 KB is sent to the OS. These embodiments utilize the feature of the OS to read extra data to read the additional files of the file bundle. Since the OS reads additional data from the hard drive, storing files as file bundles results in files with affinity to each other to be loaded into the file system cache.

Figure 6:
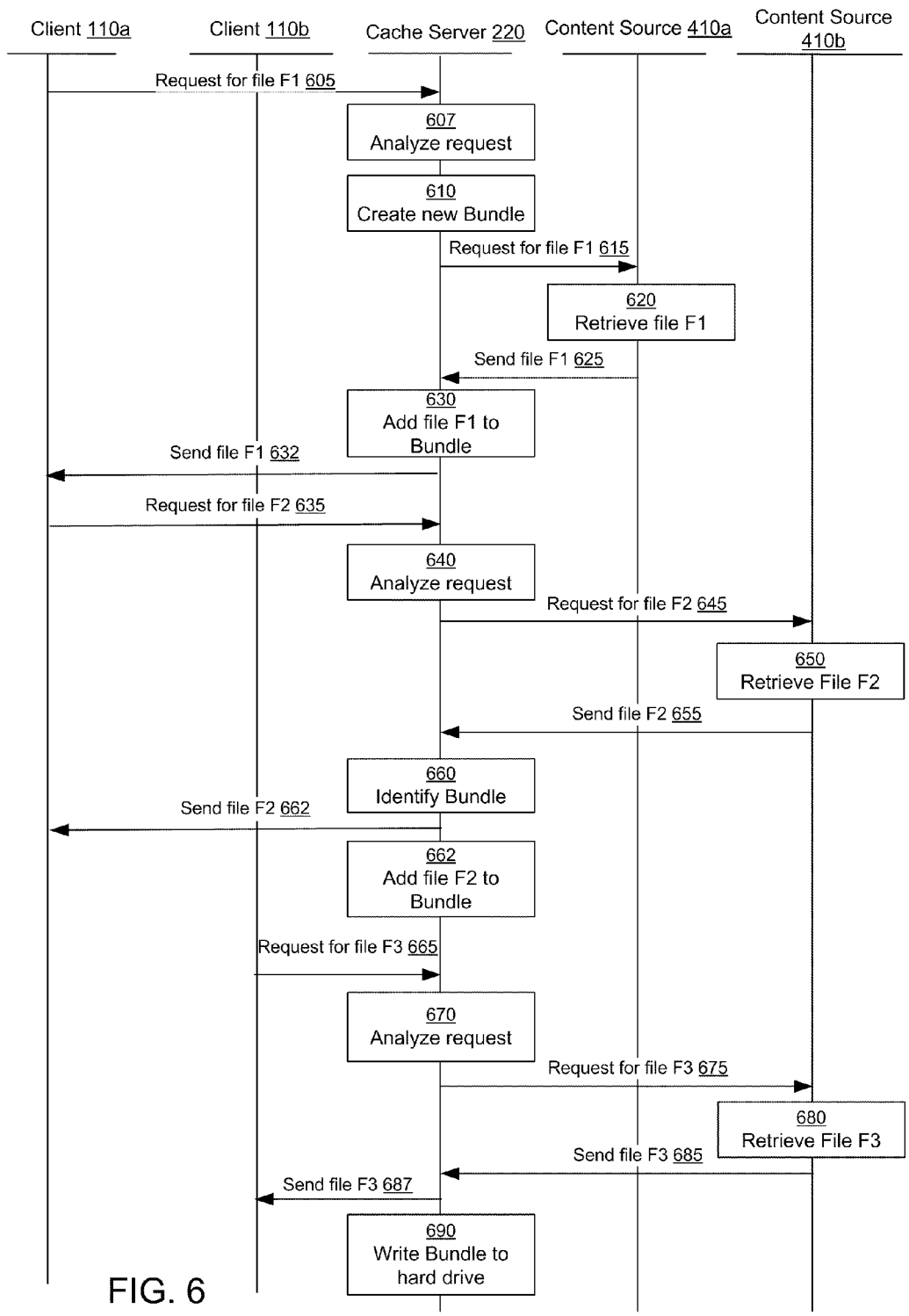
FIG. 6 is an interaction diagram illustrating how a cache server forms a file bundle, in accordance with an embodiment of the present invention.

FIG. 6 is an interaction diagram illustrating how a cache server 220 forms a file bundle, in accordance with an embodiment of the present invention. As shown in FIG. 6, a client 110a sends 605 a request for a file F1 to the cache server 220. The cache server 220 analyzes 607 the request to determine the source of the request as client 110a. If the cache server 220 determines that there is no existing file bundle associated with the client 110a storing the file F1, the cache server 220 creates 610 a new file bundle. If the file F1 is not available at the cache server 220, the cache server sends a request 615 for file F1 to an external content source 410a, which can be another cache server within the same edge POP, another edge POP, or the origin server. The content source 410a retrieves 620 the file F1 and sends 625 it to the cache server 220. The content source 410a may have to further communicate with other content sources to retrieve 620 the requested file, as explained above. The cache server 220 adds 630 the file F1 to the file bundle created and sends 632 the file F1 to the client 110a.

If the client 110a sends a second request 635 for a file F2 to the cache server 220, the cache server 640 analyzes 640 the request to determine that the request 635 is also sent by client 110a that sent 605 the previous request 605. If file F2 is not available at the cache server 220, the cache server 220 sends a request 645 to an external content source 410b to retrieve the file F2. The content source 410b retrieves 650 the file F2 and sends 655 the file to the cache server 220. The cache server 220 identifies 660 the existing bundle associated with requests from client 110a and adds 662 the file F2 to the identified bundle. In an embodiment, the existing bundle is identified using the information associated with the client that is available in the request 605, 635, for example, the IP address of the client sending the request, a URL of a web page that is referring to the requested file, or a value of a cookie stored in the client that is available in the request. The cache server 220 sends 662 the file F2 to the client 110a.

If a request for file F3 is sent by client 110b to the cache server 220, the cache server 220 analyzes 670 the request to determine the source of the request as client 110b. The cache server 220 determines that the client 110b that sent the request for file F3 is different from the client 110a that sent the previous requests 605, 635 for files F1 and F2. Accordingly, the cache server 220 determines that the file F3 is not associated with the file bundle previously created. The cache server 220 may create a new file bundle for requests received from client 110b. The cache server 220 sends 675 a request for file F3 to a content source 410b. The content source 410b retrieves 680 the file F3 and sends 685 it to the cache server 220. The cache server 220 may add the file F3 to a new file bundle created for requests received from client 110b. The cache server 220 sends 687 the file F3 to the client 110b. The cache server 220 writes 690 the file bundles created to the hard drive 310 based on criteria including, the age of the file bundle reaching a threshold or the number of the files of the bundle reaching a threshold value.

In an embodiment, a cache server 220 stores a file bundle on the hard drive only if the cache server is also the owner of the first few files of the file bundle. A cache server 220 that is not the owner of the first few files of the file bundle does not store the file bundle on the hard drive. In an embodiment, cache server stores the file bundle on the hard drive if it is the owner of at least one file within the first few files of the file bundle, for example, the first two files of the file bundle. In some embodiments, if the cache server determines not to write the file bundle to the hard drive, it may still write individual files to the hard drive. The cache server that stores a file bundle is now considered the owner of all the files in the file bundle, overriding the previous ownership of the files as defined by the hash function of the cache servers 220.

The cache server that stores the file bundle receives requests for a file in the bundle from other cache servers, and responds by returning the requested file along with information identifying the related files stored in the bundle. In an embodiment, the information identifying a file comprises a dedicated HTTP response header used to represent URLs of the other files loaded into memory as part of the file bundle. The cache server that receives the file from the owner cache server along with information about other files available in the bundle stores the information in a dynamic affinity table. The dynamic affinity table maps the file URL to a cache server that is the owner of the file by virtue of storing a bundle containing the file. If the file ownership cannot be determined using the dynamic affinity table because there is no corresponding entry in the dynamic affinity table, the file ownership is determined using the hash function. Since file bundle information changes dynamically, in an embodiment, the dynamic table is cleared periodically and rebuilt based on the latest information available. For example, every 30 seconds the dynamic table may be examined and information that is older than 5 minutes can be cleared.

Figure 7:
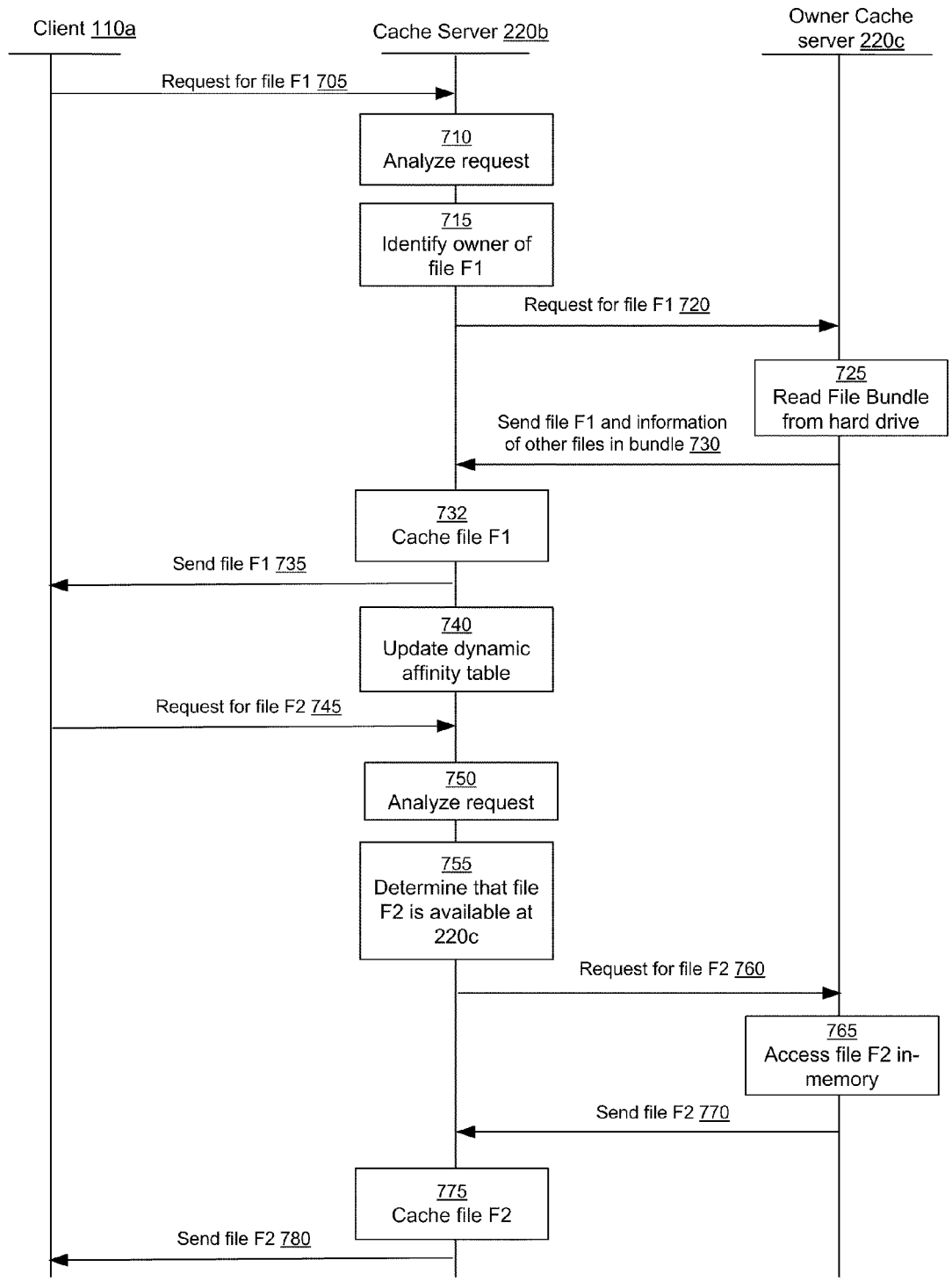
FIG. 7 is an interaction diagram illustrating how a cache server may retrieve files from another cache server that is the owner of the file, in accordance with an embodiment of the present invention.

FIG. 7 is an interaction diagram illustrating how a cache server may retrieve files from another cache server that is the owner of the file, in accordance with an embodiment. Cache servers 220b, 220c are assumed to be within an edge POP. The client 110a requests 705 a file F1 from cache server 220b. The cache server 220b analyzes the request to determine the source of the request as the client 110a. Assume that the dynamic affinity table at the cache server 220b does not have any entry for file F1. The cache server 220b uses a hash function and identifies 715 the owner of the file F1 as the cache server 220c. The cache server 220b sends a request 720 for the file F1 to the cache server 220c. Assuming the owner cache server 220c has a file bundle associated with file F1, it reads 725 the file bundle from its hard drive. The owner cache server 220c sends 730 the file F1 to the cache server 220b along with information identifying other files stored in the file bundle, for example, file F2. The cache server 220b caches 732 the file F1 in its memory and sends 735 the file F1 to the requesting client 110a. The cache server 220b updates 740 its dynamic affinity table based on the information received from cache server 220c about the other files in the file bundle maintained by owner cache server 220c, including file F2. The dynamic affinity table maps the location of the file F2 and other files of the file bundle as the cache server 220c.

A request 745 for file F2 is subsequently received from client 110a by cache server 220b. The cache server 220b analyzes the request to determine the source of the request as the client 110a. The cache server 220b determines 755, using its dynamic affinity table, that file F2 is available at owner cache server 220c. The cache server 220b sends a request 760 for the file F2 to the cache server 220c. The cache server 220c accesses the file F2 from its memory since the file was loaded along with other files of the bundle. The cache server 220c sends 770 the file F2 to the cache server 220b. The cache server 220b caches 775 the file F2 in its memory and sends 780 the file F2 to the requesting client 110a.

To summarize, the interaction diagram in FIG. 7 illustrates how the cache server 220b updates its dynamic affinity table to determine where a file is stored as a file bundle. This allows a cache server 220b to subsequently retrieve all related files of the file bundle from one cache server instead of having to search through various sources. In one embodiment, the cache server 220b may combine multiple requests for files stored in the file bundle and receive them together to optimize the communication overhead between cache servers. Furthermore, the files in the owner cache server are loaded into its memory after a single seek of the hard drive since they are stored adjacent to each other in the file bundle. As a result, the number of seek operations performed to read the files from the hard drive is reduced.

Figure 8:
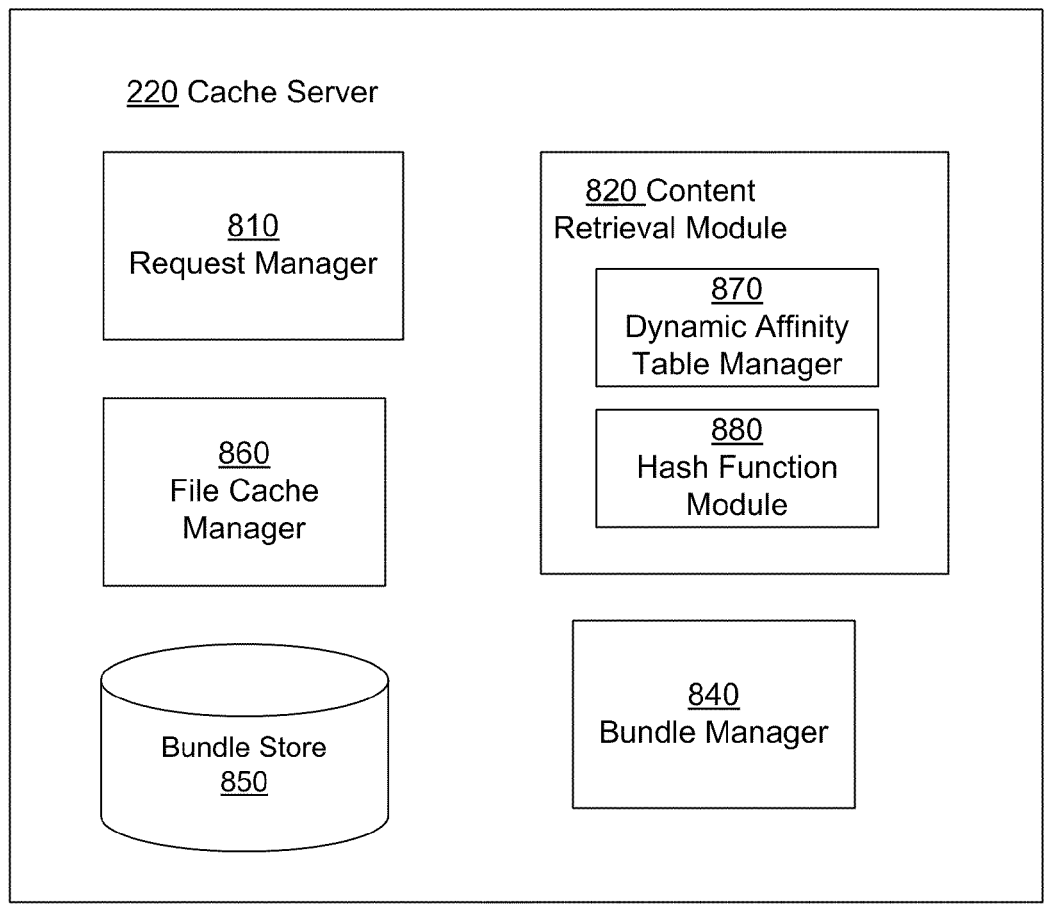
FIG. 8 illustrates the various functional software modules of a cache server, in accordance with an embodiment of the present invention.

FIG. 8 illustrates the various functional software modules of a cache server, in accordance with an embodiment. The cache server 220 comprises a request manager 810, a content retrieval module 820, a bundle manager 840, a bundle store 850, and a file cache manager. The request manager 810 receives requests for files from clients or from other cache servers 220 or edge POPs 140. The request manager 810 analyzes the requests for information identifying the source of the request. The bundle store 850 is the portion of the hard drive 310 that stores file bundles. The bundle manager 840 performs operations related to management of file bundles including determining the file bundle to which a file is added, determining when a file bundle is stored on the disk and so on. In an embodiment, the bundle manager 840 maintains a bundle queue that maps information identifying a client to a queue structure that contains files that are requested by the client. The information identifying the client includes, the IP address of the client, a URL of a web page that refers to the file that is requested, and/or cookies stored in the client. The bundle manager 840 determines when to write a file bundle to the bundle store 850 based on criteria including the age of the file bundle or the size of the bundle in terms of number of files in the file bundle.

The content retrieval module 820 determines whether a requested file is available within the cache server 220, for example, in the memory 455 or in the bundle store 850. If the content retrieval module 820 determines that the requested file is not available in the cache server 220, it retrieves the file from an external content source, for example, by sending a request to a cache server that is an owner of the file. The content retrieval module 820 further comprises a dynamic affinity table manager 870 and a hash function module 880. The dynamic affinity table manager 870 manages the dynamic affinity table that stores the location of files at cache servers within the edge POP. The information in the dynamic affinity table is updated whenever the cache server receives information about file bundles stored at other cache servers of the edge POP. The hash function module 880 determines the owner cache server 220 of a file based on a hash function. The content retrieval module 820 attempts to retrieve files from other sources if the files are not available locally at a cache server. The content retrieval module can retrieve files from other edge POPs 140 or the origin server 120.

A file that is loaded in memory from the bundle store 850 is stored in the file cache manager 860 for fast access. The file cache manager 860 also stores files retrieved from external sources outside the cache server 220. In an embodiment, the file cache manager 860 maintains a limit on the size of the file cache. If new files are added to the file cache that is full, the file cache manager 860 flushes files from the cache to make room for new files. A file is flushed from the file cache based on certain criteria, including how long the file has been in the file cache, how often the file is accessed or other criteria used for managing caches.

Figure 9:
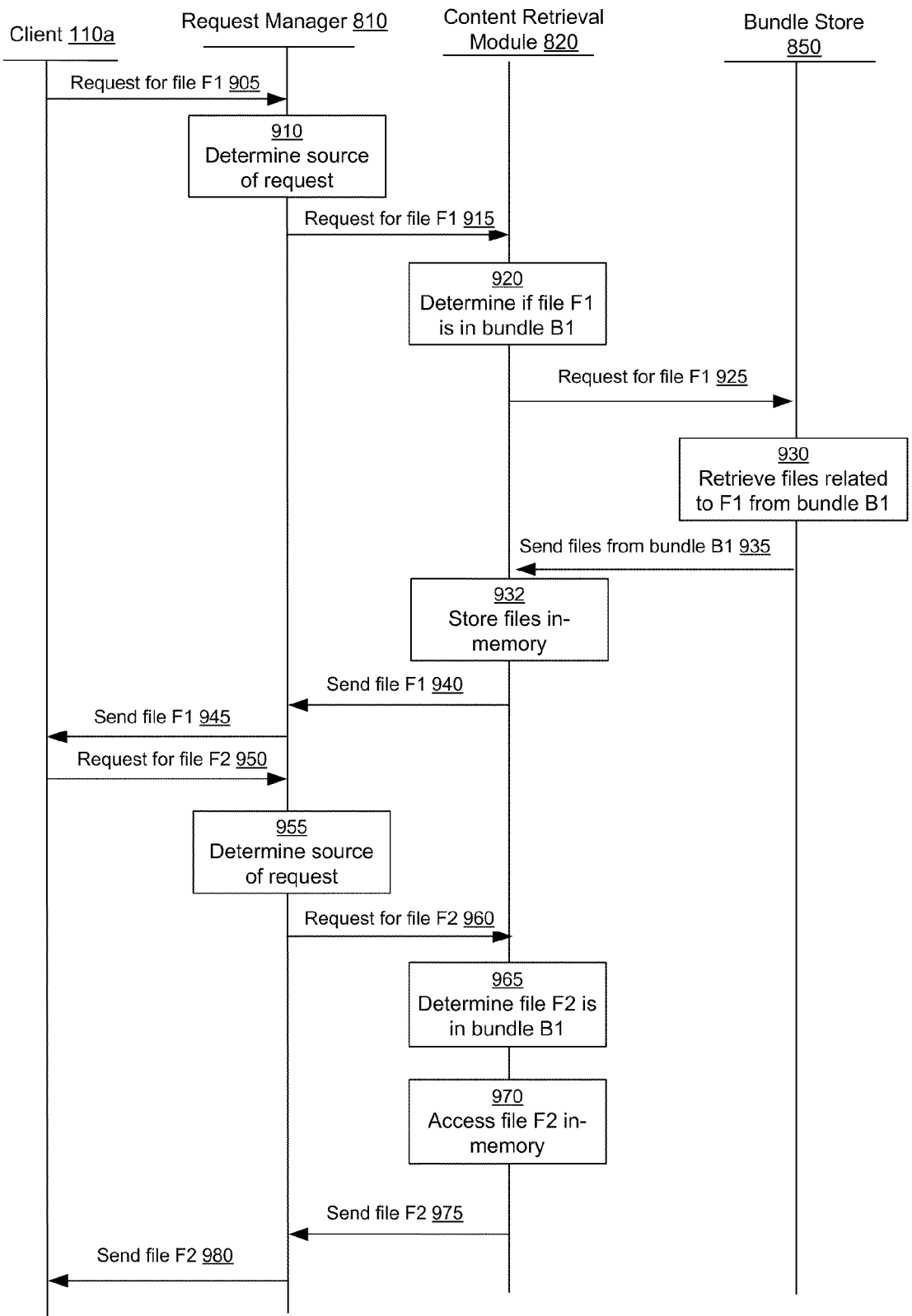
FIG. 9 is an interaction diagram illustrating how use of file bundles improves file retrieval time for processing multiple requests from a client, in accordance with an embodiment of the present invention.

FIG. 9 is an interaction diagram illustrating how a file bundle improves file retrieval time for requests received from a client, in accordance with an embodiment of the present invention. FIG. 9 assumes that files F1 and F2 were previously requested by the client 110a and are stored in a file bundle at the cache server 220. FIG. 9 also assumes that the files F1 and F2 are not available in memory in the cache server 220 when they are requested by the client 110a. The client 110a sends 905 a request for file F1 which is received by the request manager 810 of cache server 220. The request manager 810 determines 910 the source of the request as client 110a. The request manager 810 sends the request 915 for the file to the content retrieval module 820 of cache server 220. The content retrieval module 820 determines 920 that the file F1 is stored in the bundle store 850 in the file bundle B1. The content retrieval module 820 sends the request for the file F1 to the bundle store 850 of cache server 220. The bundle store 850 retrieves 930 file F1 and the files related to file F1 from the bundle B1 and sends 935 them to the content retrieval module 820. The retrieval of the file by the bundle store 850 requires a seek operation of a hard drive. Assume that the set of files sent 935 by the bundle store 850 includes files F1 and F2. The content retrieval module 820 stores 932 the files retrieved in memory 455 and sends 940 the requested file F1 to the request manager 810. The other file F2 read together from the bundle is stored in file cache manager 860. The request manager 810 responds to the request 905 from the client 110a by sending 945 the file F1.

The client 110a sends 950 a subsequent request for a file F2. If the request 950 is received after a very large delay compared to request 905, it is possible that the file related to bundle B1 are flushed out of the memory 455 to make room for other files. Assume that the time gap between the two requests sent by the client 110a is short enough that the files related to the bundle B1 are still available in memory 455 when the request 950 for file F2 is received. The request manager 810 determines 955 the source of the request 950 as client 110a. The request manager 810 sends 960 a request to the content retrieval module 820. The content retrieval module 820 determines 965 that the bundle of files requested by client 110a is available in memory 455 and includes the requested file F2. Therefore, the content retrieval module 820 accesses 970 the file F2 in memory 455 and sends 975 the file F2 to the request manager 810 which sends 980 the file F2 to the client 110a. As a result, the content retrieval module 820 is not required to access the bundle store 850 to access the file F2 and a single seek operation was sufficient to serve two requests received from client 110a.

Figure 10:
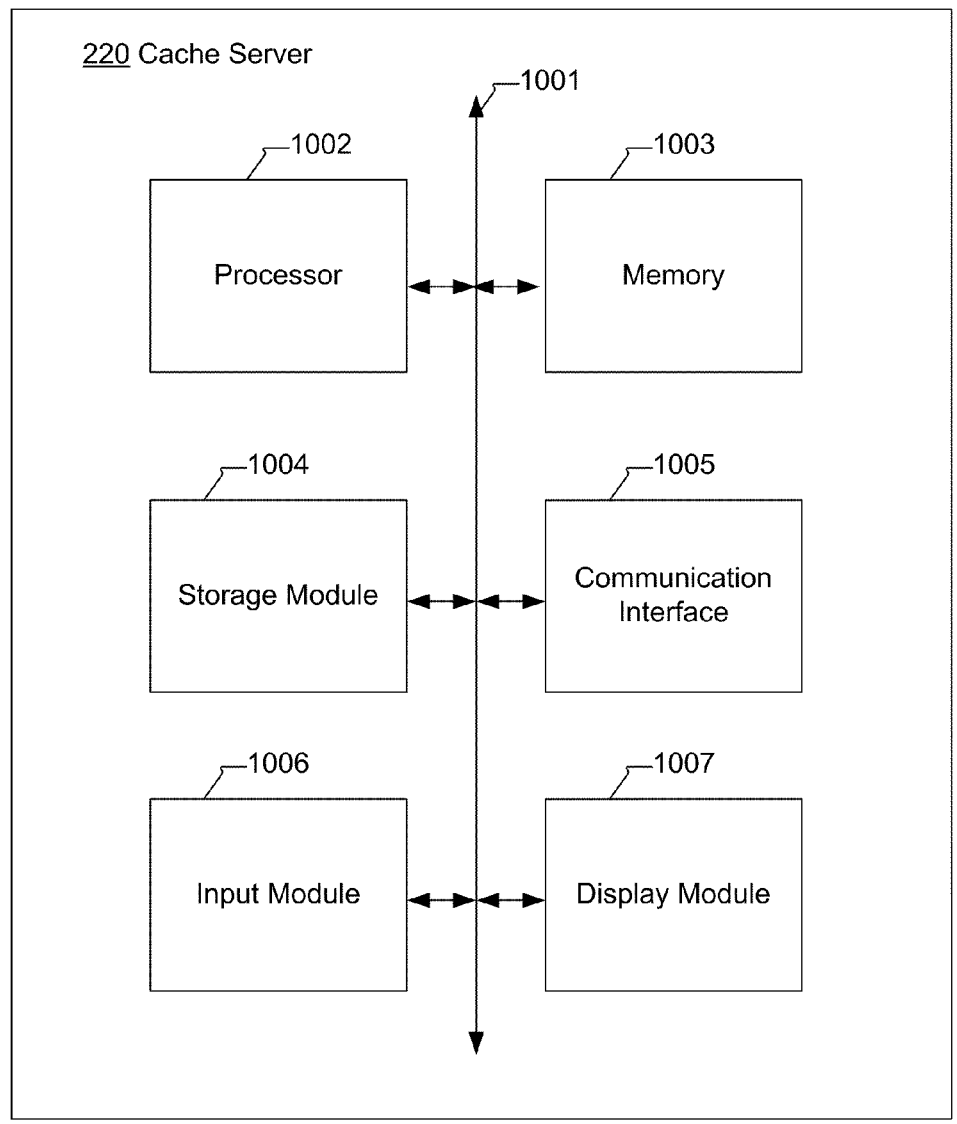
FIG. 10 shows the hardware architecture of a cache server, in accordance with an embodiment of the present invention.

FIG. 10 illustrates the hardware architecture of a cache server 220, according to one embodiment of the present invention. In one embodiment, the cache server 220 is a server computer including components such as a processor 1002, a memory 1003, a storage module 1004, an input module (e.g., keyboard, mouse, and the like) 1006, a display module 1007, and a communication interface 1005, exchanging data and control signals with one another through a bus 1001. The storage module 1004 is implemented as one or more computer readable storage medium (e.g., hard disk drive), and stores software that is run by the processor 1002 in conjunction with the memory 1003 to implement the cache server functionality according to embodiments of the present invention as illustrated herein. Operating system software and other application software may also be stored in the storage device 1004 to run on the processor 1002. Note that not all components of the cache server 220 are shown in FIG. 10 and that certain components not necessary for illustration of the present invention are omitted herein.

Figure 11:
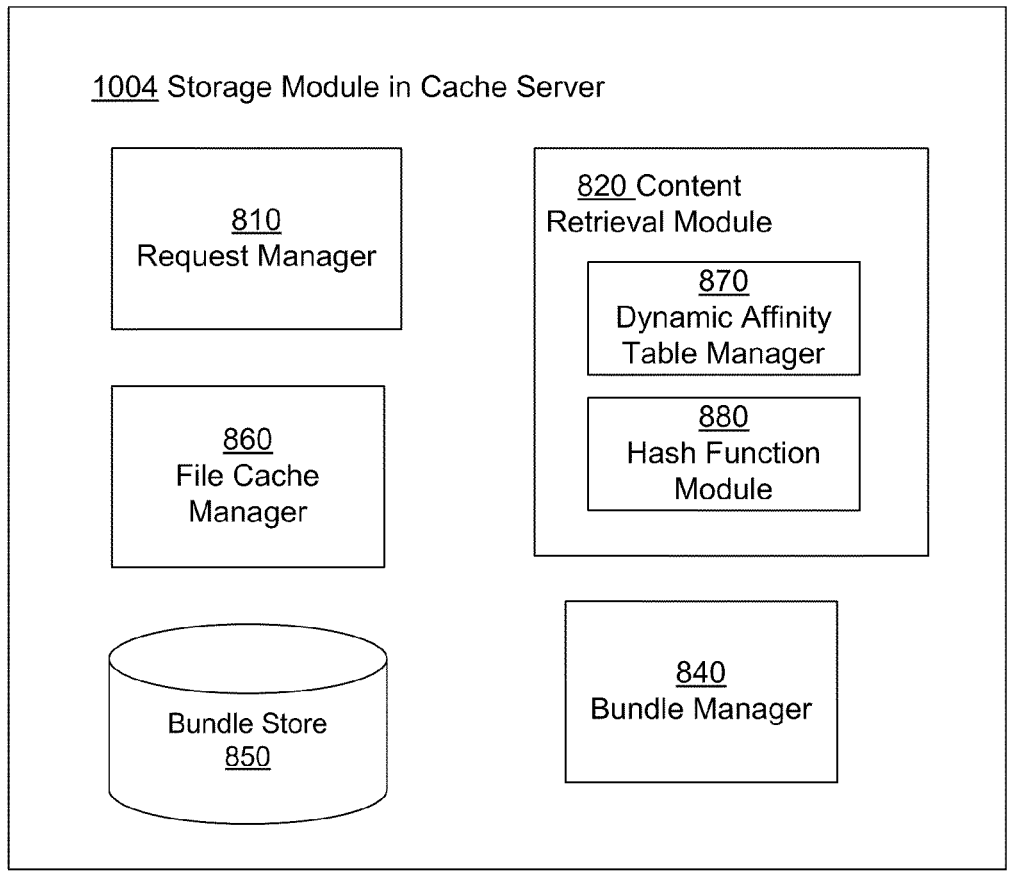
FIG. 11 shows the storage module of a cache server storing various functional software modules, in accordance with an embodiment of the present invention.

FIG. 11 illustrates the storage module 1004 of a cache server 220 storing various software modules of the cache server 220, including a request manager 810, a content retrieval module 820, a dynamic affinity table manager 870, a hash module 880, a file cache manager 860, a bundle manager 840, and a bundle store 850.

As can be seen from the description above, the embodiments herein improve data access time for files accessed using a CDN. Multiple files requested by a client are aggregated from multiple sources by a cache server. The cache server stores files requested by the same client together as a file bundle on the hard drive. A file bundle is stored on the hard drive such that multiple files in the bundle can be read using a single seek operation of the hard drive. The ability to read multiple files using a single seek operation improves data access time by reducing the number of seek operations performed to retrieve related data. Furthermore, aggregating related files in a cache server improves data access time since the required data can be retrieved from a single cache server rather than multiple sources.

Upon reading this disclosure, those of skill in the art will appreciate still additional alternative designs for providing fast data access through CDNs. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a cache server of a content delivery network including a plurality of cache servers, a computer-implemented method for storing files on the cache server, the method comprising:
   receiving a first request for a first file;
   retrieving the first file from a first content source;
   receiving a second request for a second file;
   retrieving the second file from the first content source or a second content source;
   determining whether the first request and the second request are received from a same client; and
   responsive to determining that the first request and the second request are received from the same client, storing the first file and the second file on a storage device of the cache server with metadata associating the first file with the second file in a file bundle.

2. The method of claim 1, wherein determining that the first request and the second request are received from a same client comprises:
   identifying a first parameter associated with the first request, wherein the first parameter is associated with a first client;
   identifying a second parameter associated with the second request, wherein the second parameter is associated with a second client; and
   determining that the first parameter matches the second parameter.

3. The method of claim 1, wherein the first request and the second request are determined to be from a same client if the first request and the second request are received from a same connection between the client and the cache server.

4. The method of claim 1, wherein the first request and the second request are determined to be from a same client if a first network address obtained from the first request is identical to a second network address obtained from the second request.

5. The method of claim 1, wherein the first request and the second request are determined to be from a same client if a first cookie obtained from the first request matches a second cookie obtained from the second request.

6. The method of claim 1, wherein the first file and second file are stored on the storage device in adjacent locations.

7. The method of claim 1, wherein the cache server is a first cache server of an edge point of presence (POP) of the content delivery network and the first content source is a second cache server of the edge POP of the content delivery network.

8. The method of claim 1, wherein the cache server is in a first edge point of presence (POP) of the content delivery network and the first content source is another cache server in a second edge POP of the content delivery network.

9. The method of claim 1, wherein the first content source is an origin server.

10. The method of claim 1, wherein the metadata comprises a pointer from the first file to the second file in the storage device.

11. The method of claim 1, wherein the first file and the second file are stored on the storage device in the file bundle such that the first and the second file can be read by a single seek operation of the storage device.

12. The method of claim 1, further comprising:
receiving a third request for a third file;
retrieving the third file from a third content source; and
responsive to determining that the third request is received from another client different from the client from which the first request and the second request are received, storing the third file on the storage device of the cache server in another file bundle different from said file bundle in which the first file and the second file are stored.

13. The method of claim 1, wherein the first file and the second file of the file bundle are temporarily stored in a memory device of the cache server before the first file and the second file are stored in the storage device.

14. The method of claim 13, wherein the first file and the second file are stored in the storage device after a predetermined amount of time passes since storage of the first file and the second file in the memory device of the cache server.

15. The method of claim 13, wherein the first file and the second file are stored in the storage device after a predetermined number of files are included in the file bundle that is temporarily stored in the memory device.

16. A cache server of a content delivery network including at least a processor and a computer readable storage medium storing computer instructions configured to cause the processor to perform a computer-implemented method of storing files on the cache server, the method comprising:
receiving a first request for a first file;
retrieving the first file from a first content source;
receiving a second request for a second file;
retrieving the second file from the first content source or a second content source;
determining whether the first request and the second request are received from a same client; and
responsive to determining that the first request and the second request are received from the same client, storing the first file and the second file on a storage device of the cache server with metadata associating the first file with the second file in a file bundle.

17. The cache server of claim 16, wherein determining that the first request and the second request are received from a same client comprises:
identifying a first parameter associated with the first request, wherein the first parameter is associated with a first client;
identifying a second parameter associated with the second request, wherein the second parameter is associated with a second client; and
determining that the first parameter matches the second parameter.

18. The cache server of claim 16, wherein the method further comprises
receiving a third request for a third file;
retrieving the third file from a third content source; and
responsive to determining that the third request is received from another client different from the client from which the first request and the second request are received, storing the third file on the storage device of the cache server in another file bundle different from said file bundle in which the first file and the second file are stored.

19. A non-transitory computer readable storage medium storing a computer program product including computer instructions configured to cause a processor of a computer to perform a computer-implemented method of storing files on a cache server of a content delivery network, the method comprising:
receiving a first request for a first file;
retrieving the first file from a first content source;
receiving a second request for a second file;
retrieving the second file from the first content source or a second content source;
determining whether the first request and the second request are received from a same client; and
responsive to determining that the first request and the second request are received from the same client, storing the first file and the second file on a storage device of the cache server with metadata associating the first file with the second file in a file bundle.

20. The non-transitory computer readable storage medium of claim 19, wherein determining that the first request and the second request are received from a same client comprises:
identifying a first parameter associated with the first request, wherein the first parameter is associated with a first client;
identifying a second parameter associated with the second request, wherein the second parameter is associated with a second client; and
determining that the first parameter matches the second parameter.

21. The non-transitory computer readable storage medium of claim 19, wherein the method further comprises
receiving a third request for a third file from the content delivery network;
retrieving the third file from a third content source; and
responsive to determining that the third request is received from another client different from the client from which the first request and the second request are received, storing the third file on the storage device of the cache server in another file bundle different from said file bundle in which the first file and the second file are stored.

* * * * *